No. 834,354. PATENTED OCT. 30, 1906.
T. R. R. ASHTON.
MAGAZINE FIREARM.
APPLICATION FILED JAN. 13, 1905.

6 SHEETS—SHEET 1.

Witnesses.
W^m Munn Andrew
Henry J. Brockwell

Inventor:
T. R. R. Ashton
by Fairfax & Wetter
Attorneys

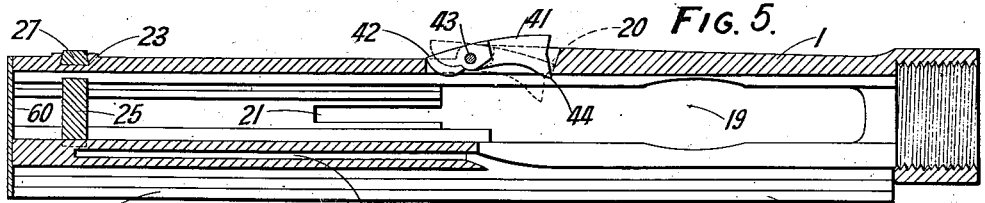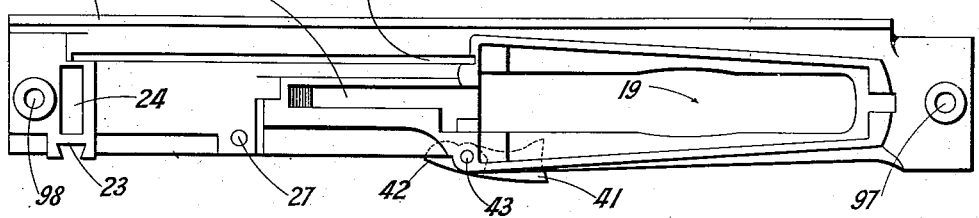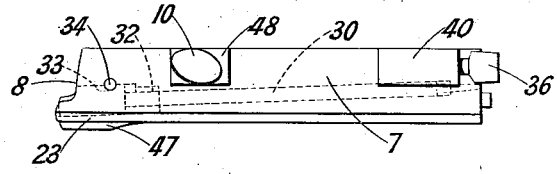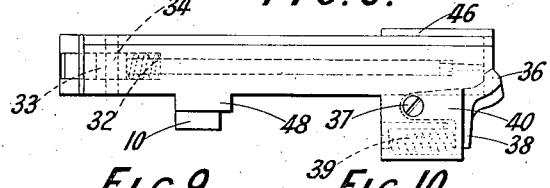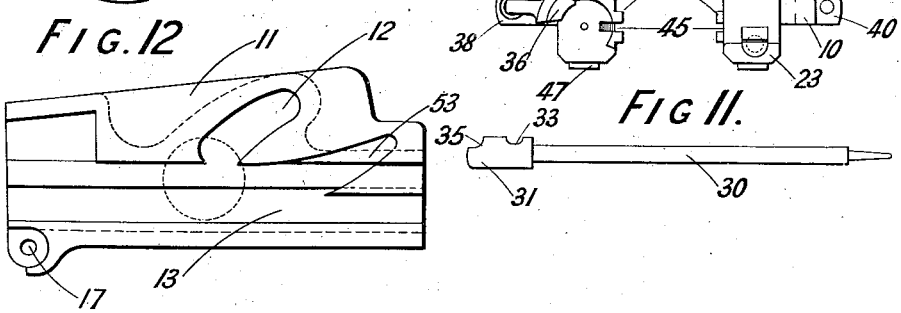

No. 834,354. PATENTED OCT. 30, 1906.
T. R. R. ASHTON.
MAGAZINE FIREARM.
APPLICATION FILED JAN. 13, 1905.
6 SHEETS—SHEET 3.
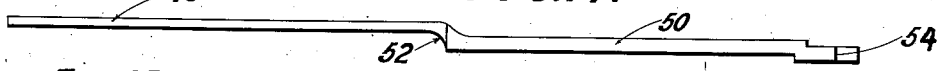
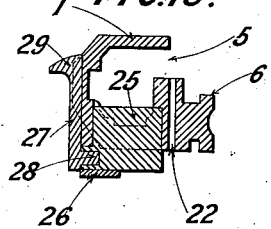
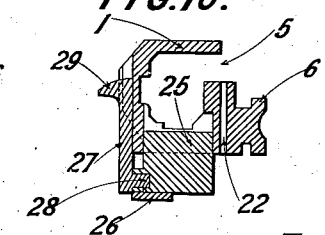
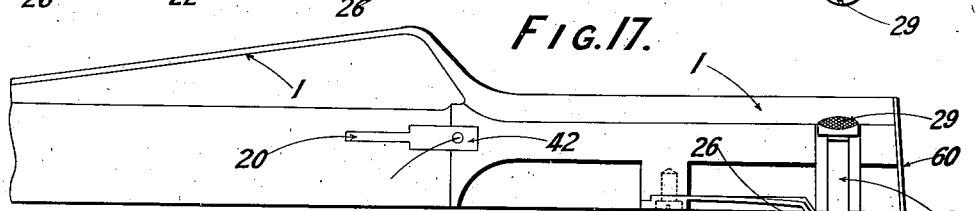
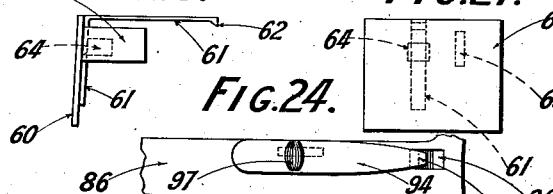
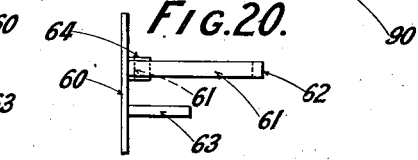
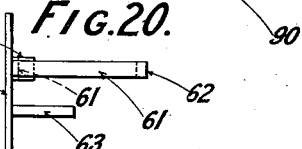
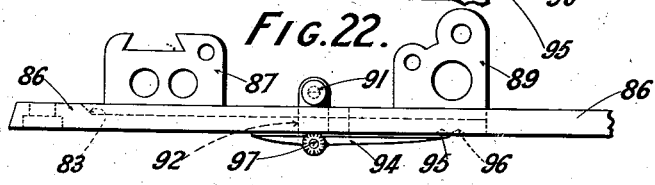
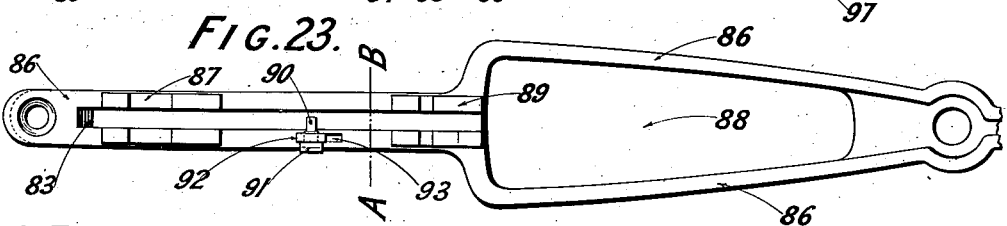
Witnesses
Wm Munn Andrew
Henry J. Brockwell
Inventor:
T. R. R. Ashton
by Fairfax Wetter
Attorneys No. 834,354. PATENTED OCT. 30, 1906.
T. R. R. ASHTON.
MAGAZINE FIREARM.
APPLICATION FILED JAN. 13, 1905.

6 SHEETS—SHEET 4.

Witnesses.
Wm Munn Andrew
Henry J. Brockwell

Inventor:
T. R. R. Ashton
by Fairfax Vetter
Attorneys

No. 834,354. PATENTED OCT. 30, 1906.
T. R. R. ASHTON.
MAGAZINE FIREARM.
APPLICATION FILED JAN. 13, 1905.
6 SHEETS—SHEET 5.
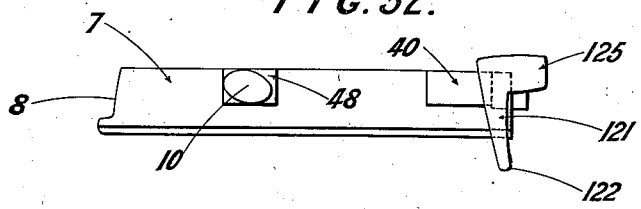
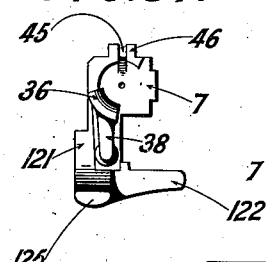
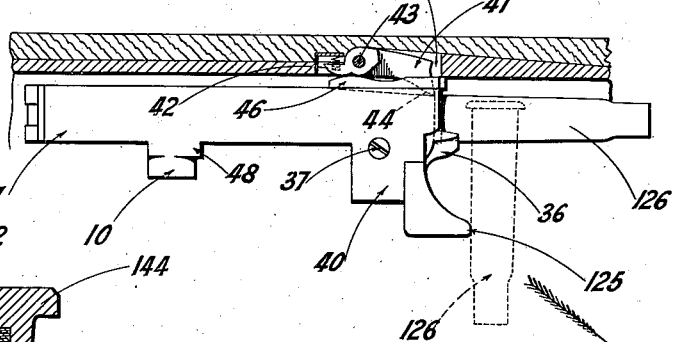
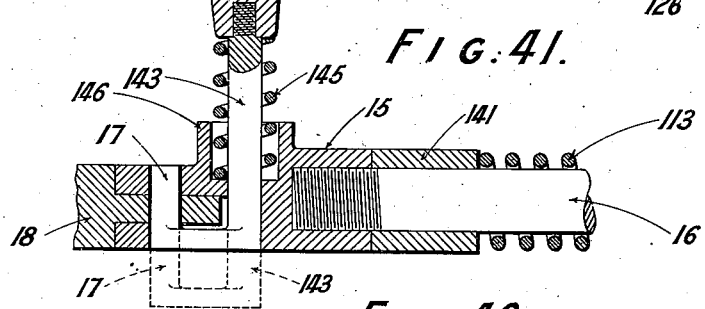
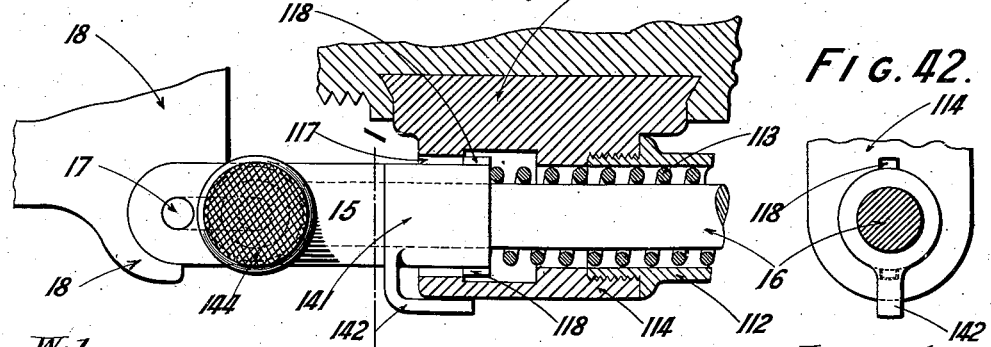
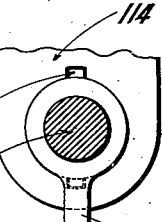
Witnesses.
Wm Munn Andrew
Henry J. Brockwell.
Inventor:
T. R. R. Ashton
by Fairfax & Wetter
Attorneys No. 834,354. PATENTED OCT. 30, 1906.
T. R. R. ASHTON.
MAGAZINE FIREARM.
APPLICATION FILED JAN. 13, 1905.
6 SHEETS—SHEET 6.
FIG.35.
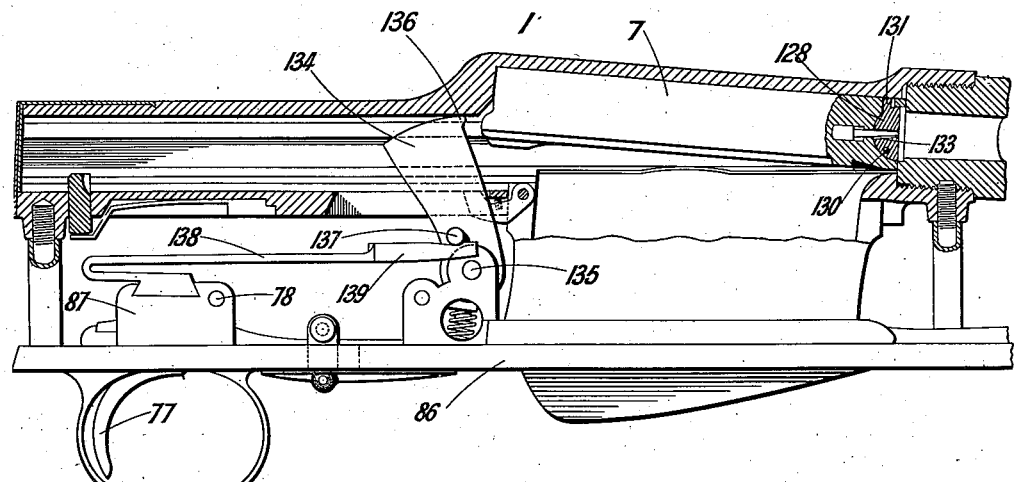
FIG.36.
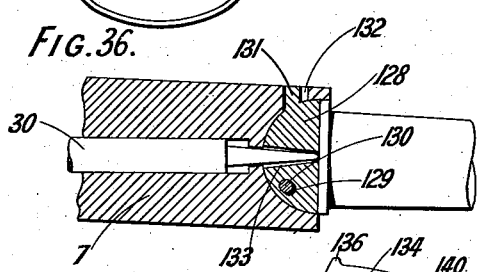
FIG.37.
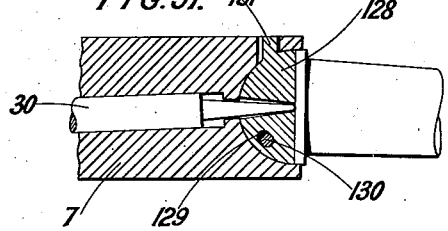
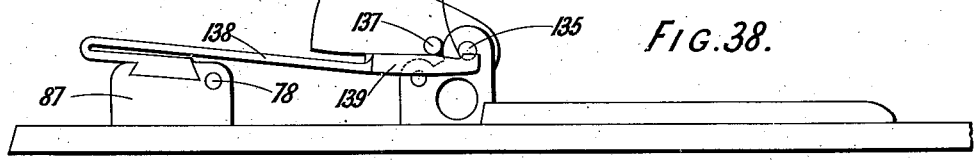
FIG.38.
FIG.39.
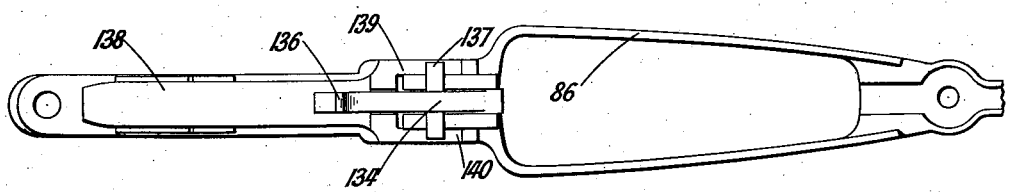
Witnesses
Wm Munn Andrew
Henry J. Brockwell
Inventor:
T. R. R. Ashton
by Fairfax & Ritter
Attorneys

UNITED STATES PATENT OFFICE.

THOMAS ROBERT RANEY ASHTON, OF LONDON, ENGLAND.

MAGAZINE-FIREARM.

No. 834,354.  Specification of Letters Patent.  Patented Oct. 30, 1906.

Application filed January 13, 1905. Serial No. 240,962.

*To all whom it may concern:*

Be it known that I, THOMAS ROBERT RANEY ASHTON, engineer, a subject of the King of the British Dominions, residing at London, England, (and whose post-office address is 2 Upper Montague street, Bloomsbury, London, England,) have invented Improvements in Magazine-Firearms, of which the following is a specification.

This invention relates to automatic or semi-automatic small-arms, and more particularly to magazine-rifles which have a sliding breech block or bolt with vertical locking action.

One part of my improvements provides simple and efficient means for operating such breech-blocks by the pressure of a small portion of the powder-gases acting on a piston.

Another part serves to protect the breech mechanism from sand and dust.

Another part serves to insure the proper extraction and ejection of the empty cartridge-cases.

Another part relates to a simple and efficient trigger mechanism suitable for this kind of small-arms.

Another part relates to safety or auxiliary locking devices, as will be hereinafter more fully explained, and illustrated by the drawings.

My invention also comprises certain details of construction and combinations of parts, as will be hereinafter described, and illustrated by the drawings.

Figure 1:
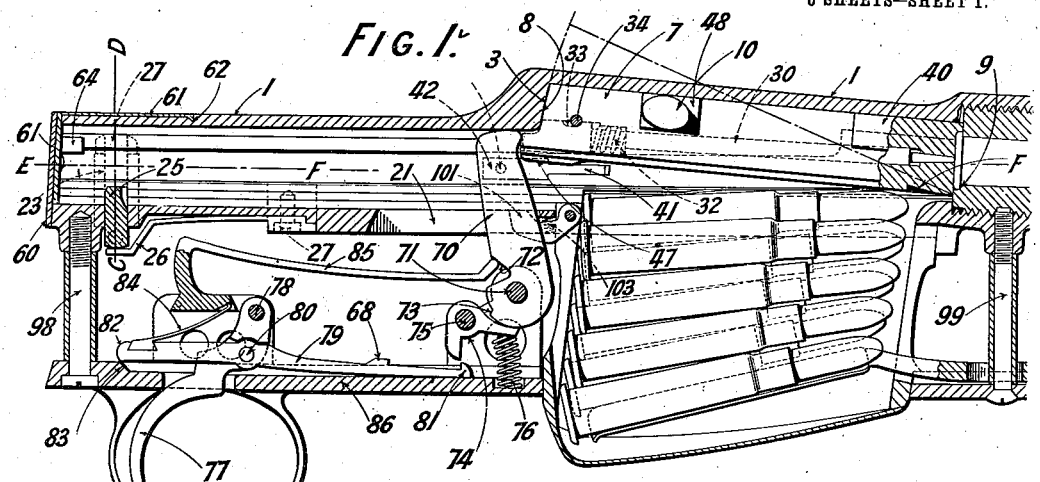
Figure 2:
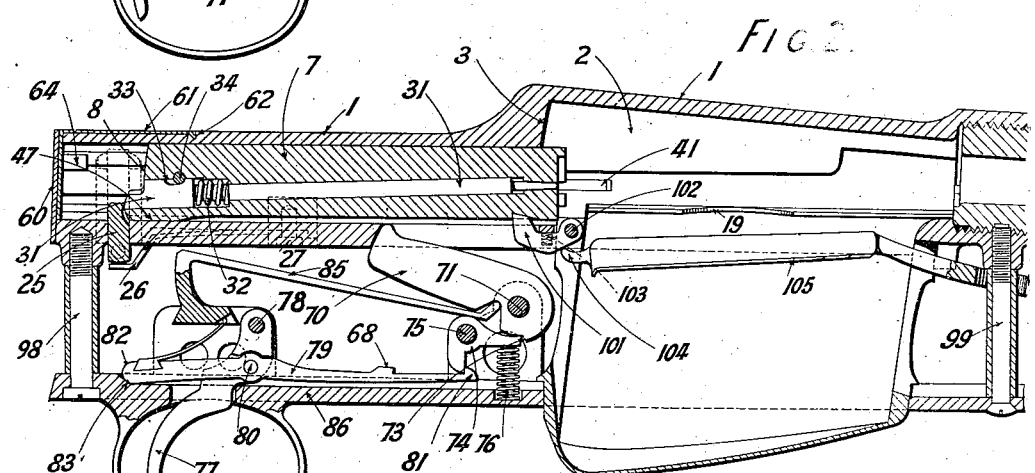
Figure 3:
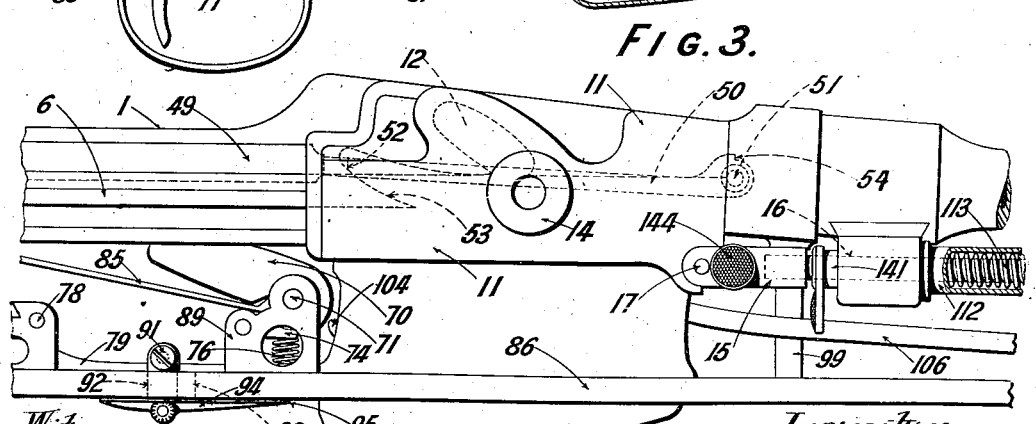
Figure 26:
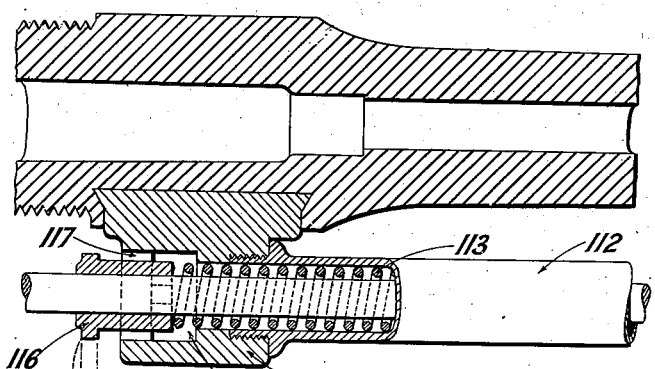
Figure 27:
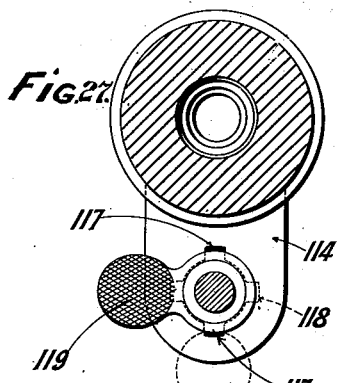
Figure 28:
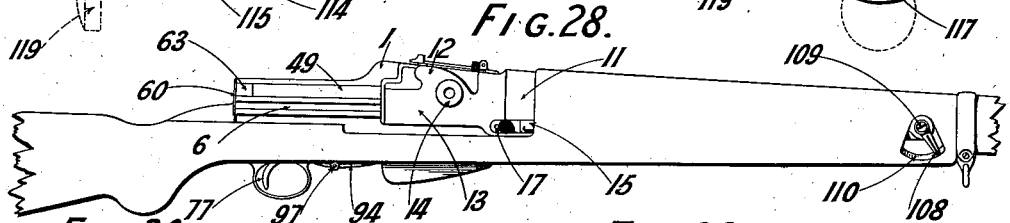
Figures 29, 30:
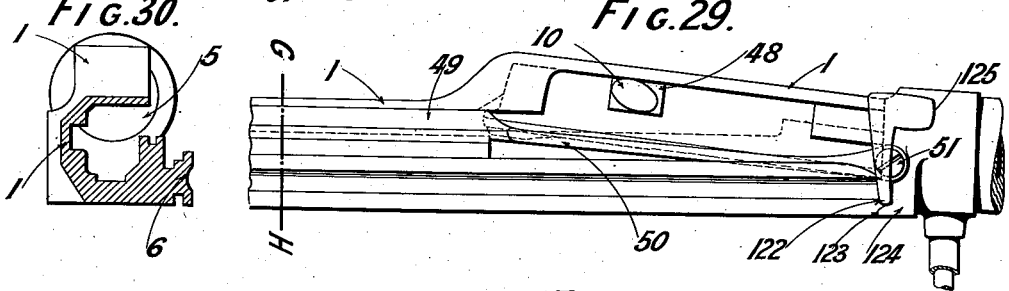
Figure 31:
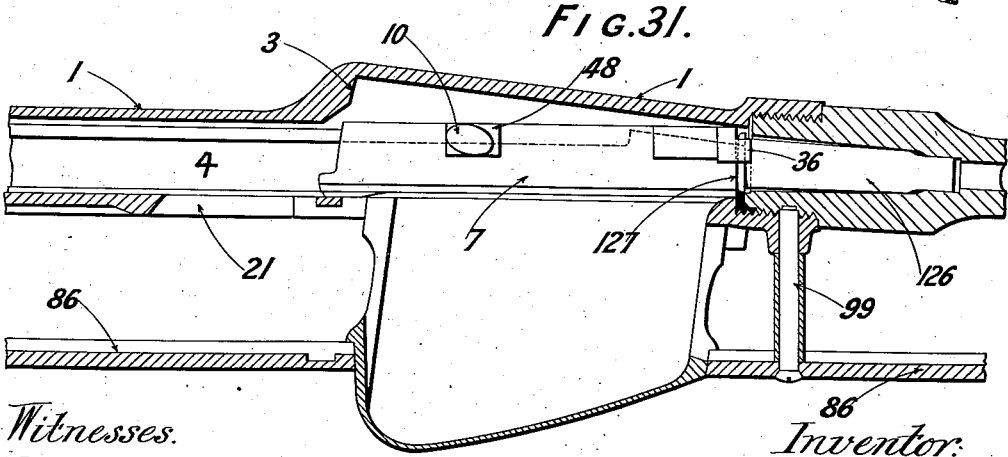

In the accompanying drawings, Figure 1 is a longitudinal section through the rear part of a rifle embodying my invention, the magazine being full and the breech-block, hammer, and trigger being in the position which they occupy immediately after the trigger has been pulled. Fig. 2 is a similar view after the bolt has been withdrawn, and thereby the breech opened. Fig. 3 is a side view showing the straight-pull slide and the rear end of the gas-cylinder which contains the piston connected with the straight-pull slide. Fig. 4 is a rear view of the frame, showing the position of the straight-pull slide. Fig. 5 is a horizontal section through the frame or breech-body along line E F of Fig. 1 after the removal of the breech-block. Fig. 6 is an under side view of the frame. Fig. 7 is a side view of the breech block or bolt. Fig. 8 is a plan of the same. Fig. 9 is a front view of the same. Fig. 10 is a rear view of the same. Fig. 11 is a side view of the firing-pin. Fig. 12 is a side view of the straight-pull slide seen from inside. Fig. 13 is a side elevation of the sliding shutter serving to prevent the intrusion of sand into the breech. Fig. 14 is a plan of the same. Fig. 15 is a transverse section through the rear end of the frame or breech-body along line C D of Fig. 1. Fig. 16 is a similar view, but showing a different position of the vertically-movable abutment or stop plate which limits the retractive motion of the breech-block. Fig. 17 is a side view of the rear part of the frame, showing the said stop-plate. Fig. 18 shows a plan of the thumb-piece serving to operate the said stop-plate. Figs. 19, 20, and 21 are separate views of the back sand-cover or removable plate which closes the rear end of the frame to prevent the intrusion of sand, Fig. 19 being a side view, Fig. 20 a plan, and Fig. 21 an end view, of the same. Fig. 22 is a side view of the trigger-frame or lock-plate. Fig. 23 is a plan, and Fig. 24 an under side view, of the same. Fig. 25 is a section along line A B of Fig. 23. Fig. 26 is an axial section through the rear end of the gun-barrel and of the gas-cylinder which contains the piston and spring serving to operate the straight-pull slide. Fig. 27 is a vertical transverse section of the barrel and end view of the gas-pressure cylinder looking toward the valve-box. Fig. 28 is a side view of the entire rifle. Fig. 29 is a side view of a modification serving to facilitate the extraction of the empty cartridge-case. Fig. 30 is a cross-section of the frame along line G H of Fig. 29. Fig. 31 is a vertical section of the same modification, showing the breech-block 7 after the empty cartridge-case 126 has been lifted off its seat by the extractor 36 acting on the rim 127. Figs. 32 and 34 are detail views showing the same modification. Fig. 33 is a plan of the breech-bolt shown in Fig. 29 and of the cartridge-ejector. Fig. 35 is a longitudinal vertical section of the frame or breech body and bolt, showing a further modification of the bolt-head and a modification of the trigger mechanism. Figs. 36 and 37 are sections of the bolt-head on a larger scale. Fig. 38 is a side view, and Fig. 39 is a plan, of the modified trigger mechanism shown in Fig. 35. Fig. 40 is a sectional elevation, on a larger scale, showing the rear end of the gas-cylinder and piston-rod and its connection with the straight-pull slide. Fig. 41 is a longitudinal section showing the coupling between the piston-rod and the straight-pull slide. Fig. 42 is a section through the piston-rod along line I K of Fig. 40.

The frame, breech-body, or shoe 1 is composed of two principal parts—viz: the front part, which forms an inclined recess 2, Fig. 2, and recoil-abutment 3 for the breech-bolt 7 in its forward or working position, and the rear part, which forms a tubular guide 4, Figs. 4 and 31, for the bolt during its rectilinear forward motion.

The guide 4 has on the right-hand side a longitudinal slot 5 and a prismatic bar 6 for the straight-pull slide 11, which sets the bolt in motion. The recess 2 has an upward inclination from the front toward the rear end, and the tubular guide 4 has a slight downward inclination—that is to say, the front half and the rear half of the frame 1 are inclined in opposite directions to the axis of the gun-barrel.

The rear end 8 of the bolt forms a cylindrically-curved surface with the lower front edge 9 as axis of curvature and fits upon the similarly-curved recoil-abutment 3. The bolt 7 has an oval engaging pin 10 projecting from the right-hand side of the same and entering a curved guide-slot 12, formed on the inside of the straight-pull slide 11, which has a longitudinal groove 13, so as to fit on the prismatic guide C, mentioned above. The said slot 12 and pin 10 serve to force the bolt upward into the locking position (shown in Fig. 1) after the bolt has been shot forward until its front end touches the gun-barrel. The forward and backward motions of the slide 11 may be produced either by means of the handle 14 or automatically, preferably by coupling the slide, together with the head 15 of a piston-rod 16, operated by the pressure of the powder-gases, as indicated by Fig. 3, where 17 is the pin connecting the slide with the piston-rod. If the slide 11 is pulled backward, (after the cartridge has been fired,) the engaging pin 10 (which is now at the rear end of the slot 12) will slide in the same, and thereby force the bolt 7 downward by turning on its lower front edge 9 until the rear end of the bolt is ready to enter the tubular guide 4, after which the further retractive motion of the slide will draw the bolt into the said guide 4 until it occupies its rearmost position, shown by Fig. 2—that is to say, until it impinges against the removable abutment-plate 25, Fig. 2. The abutment-plate 25 is movable in a slot 24, formed in the frame at right angles to the guide 4, and rests on the free end of a spring 26, fixed at the front end to the under side of the frame 1 by a screw, as shown by Figs. 2 and 17.

On the left-hand side of the frame 1 there is a small sliding bar 27, guided in a vertical slot 23 of the frame and connected at its lower end with the plate 25 by a pin 28, while the upper end forms a thumb-piece 29. If it is desired to draw the bolt completely out of the frame 1, the bar 27 is depressed by a pressure of the thumb, so as to overcome the upward pressure of the spring 26 and place the stop-plate 25 into the position shown by Fig. 16, leaving the interior of the breech-frame quite free for the withdrawal of the bolt.

As shown by Figs. 7, 8, and 10, the abutment-face 8 of the bolt has at its lower end a rearward projection through which passes the head 31 of the firing-pin 30. The latter has an inclined position, so that the sharp point will be situated approximately in the middle of the bolt-head. 32 is the usual spring which causes the return motion of the firing-pin. The head 31 of the pin has at the top a recess 33, through which passes a stop-pin 34, screwed into the side of the bolt for limiting the return motion of the firing-pin 20. The rear end of the head 31 has also a recess 35, as shown in Fig. 11. 36 is the extractor-hook, mounted on a pivot 37 and provided with a heel-piece 38, which is pressed forward by a coiled spring 39, inclosed in a lug 40, extending from the side of the bolt 7 and serving to hold the pivot 37.

The cartridge-ejector (shown in Fig. 5) chiefly consists of a two-armed lever 41 42, pivoted on a pin 43 and movable in a slot 20, formed in the left-hand wall of the frame 1. The tooth 44 of the front arm 41 extends into the interior of the frame 1 and is adapted to enter a groove 45, formed between a pair of narrow ledges 46, extending from the left side of the bolt, Figs. 9 and 10. The engagement pin 10 projects from a prismatic base 48, formed on the right-hand side of the bolt 7 and fitting into the side opening or slot 5, Figs. 15 and 16. To prevent dust or sand from entering through the opening 5 when the bolt is in its forward or locking position, a sliding shutter 49, Figs. 13 and 14, has been provided, the said shutter forming the extremity of a lever 50, pivoted at 51 to the frame 1 and movable up and down in a vertical slot 22, formed in the right-hand side of the frame, as shown by Fig. 5. The said sliding shutter is opened automatically by the straight-pull or main slide 11, so as to rise above the groove 22 and shut the opening 5 during the forward motion of the main slide and to descend again into the groove 22 during the retractive motion of the main slide. A catch 54 limits the upward motion of the shutter 49.

The main slide 11 has in its inner side a curved guide-groove, Figs. 3 and 12, open at the bottom, and the abutment-face 52, Figs. 13 and 14, on the arm 50 of the sliding shutter or dust-slide is adapted to impinge against the rear side or guide-face 53 of the said groove and to be forced upward by the same shortly before the straight-pull slide reaches its extreme forward position. When the main slide is drawn back, the said abutment-face 52 slides downward along the curved side 53 of the guide-groove and allows the shutter-tongue 49 to descend into the groove 22, leaving the opening 5 free for the sliding block or base 48 of the guide-pin 10.

To prevent dust and sand from entering the breech through the rear end of the tubular guide 4, a specially-constructed dust-cover 60 (shown in detail by Figs. 19, 20, and 21) may be applied to the rear end of the frame 1. A leaf-spring 61, bent to form an obtuse angle, is riveted to the inside of the sheet-metal cover 60 and provided at the extremity of its horizontal arm with a tooth 62, adapted to enter a corresponding notch formed in the upper surface of the frame 1. To the inside of the cover 60 and at right angles to the same is fixed a short blade 63, placed so as to enter the rear end of the opening 5 and to close the same when the cover is mounted in its place. If it is desired to remove the bolt from the breech, it is only necessary to depress the abutment-plate 25, as mentioned above, and then to withdraw the main slide, whereby the rear end 8 of the bolt is caused to strike against a lug 64, fixed to the spring 61 near the upper end of its upright arm. The tooth 62 of the spring 61 is drawn out of its notch and the cover 60 removed from the opening.

The trigger mechanism is so constructed that the hammer may be cocked in whatever the position the trigger happens to be, and it is provided with a simple locking-slide, by means of which the trigger mechanism may be set out of action. The trigger mechanism comprises a hammer 70, pivoted on an axle 71 and provided with a notch 72 for the extremity of the mainspring 85, also with a tooth or bent 73 for the sear 74. One arm of the latter is pressed upward by a spring 76, so as to remain in contact with the boss of the hammer, while the other arm is adapted to engage with the tooth 81 of the connecting-rod 79. The latter is a two-armed lever pivoted at 80 to the trigger 77. The short rear arm 82 of the connecting-rod is adapted to come in contact with an inclined face 83 of the trigger-plate 86 and compresses a heel-spring 84, the free end of which abuts against the stationary base of the mainspring 85. If the hammer is cocked and the trigger in its working position, as shown in Fig. 2, the rounded extremity of the short arm 82 abuts against the inclined face 83, while the tooth 81 of the long arms holds the sear, which in its turn holds the hammer. If the trigger is pulled, the connecting-rod will be drawn backward, thereby causing the extremity of the rear arm 82 to slide upward on the inclined face 83 and the tooth 81 to descend, while drawing the sear out of engagement with the hammer. The hammer is therefore free to follow the pressure of the mainspring 85, and the trigger mechanism will assume the position shown by Fig. 1.

For locking the trigger mechanism so that it cannot be operated accidentally the device shown in Figs. 22 to 25 has been adopted. It comprises a half-round pin 90, screwed into an upright boss or bar 92. The latter is guided in a slot 93 of the trigger-frame 86 and attached to an elastic slide 94, which faces the bottom of the trigger-frame 86 and has a tooth 95 adapted to drop into either of two notches 96, formed in the trigger-frame. The back of the slide 94 is provided with a button 97, by means of which the slide may be shifted within the limits allowed by the length of the slot 93. When the slide 94 is in its forward position, the half-round pin 90 faces the projection 68 of the connecting-rod 79 and keeps it in the position shown by Fig. 1—that is to say, it prevents the tooth 81 from engaging with the sear. The trigger-frame 86 is secured to the breech-frame or main frame 1 by a pair of screws 98 and 99. It has a lug 87, serving to hold the mainspring 85 and the fulcrum 78 of the trigger, also a lug 89, serving to hold the fulcrum of the hammer and the fulcrum of the sear, and it has an opening 88, affording room for the cartridge-magazine, as shown by Figs. 1, 2, and 3. The drawings also show a device for automatically locking the bolt in the retracted position when the magazine is empty. This device, which does not form a part of the present invention, comprises a pawl 101, pivoted at 102, a tooth 103 at the end of the platform 105 for lifting the pawl 101 into engagement with the bolt 7, and a spring 103 for pressing the pawl downward. The movable platform 105 is at the end of a lever 106, which has its fulcrum a suitable distance from the screw 99.

108 is the regulating-lever for the gas-action, having its fulcrum at 109. The said lever is mounted on a needle-valve adapted to control the admission of powder-gases to the gas-pressure cylinder in the manner shown in detail by Figs. 25–27 of my application for patent, Serial No. 181,368, filed November 16, 1903.

110 is a quadrant for holding the lever 108 at the desired angle.

The construction of the gas-cylinder and accessories (represented by Figs. 26 and 27 and Figs. 40 to 42) has for its object to facilitate the removal of the piston-rod and piston and their subsequent reinsertion. The rear end of the gas-cylinder 112, inclosing the spring 113, is screwed into a side arm or casing 114, fixed to the gun-barrel. This casing is bored out parallel with the gun-barrel and receives a specially-shaped bush or ferrule 116, which serves as a guide and bearing for the piston-rod, and is provided with a handle 119, as shown in Fig. 27. The cylindrical main part of the bush 116, which fits into the cylindrical mouth of the casing, has at its inner end a pair of diametrically opposite teeth or lugs 118, which fit into a pair of diametrically opposite recesses or grooves 117, formed in the mouth of the casing. The latter has a cylindrical chamber 115 wide enough to allow the lugs 118 of the ferrule 116 to turn on the axis of the piston-rod. If the parts are in working position, as shown by Figs. 26 and 27, and it is desired to withdraw the gas-piston from the cylinder, it is only necessary to turn the ferrule 116 about ninety degrees, so as to bring the lugs 118 into line with the grooves 117, and then to draw the ferrule 116 out of the casing 114, after which the piston-rod, together with the piston and the spring 113, may be drawn out. The construction of the gas-cylinder and accessories and of the trigger mechanism is applicable also to other types of breech action—for instance, to automatic rifles which have sliding breech-blocks with rotary locking action.

The modification represented by Figs. 29 to 34 has for its object to facilitate the initial extraction of the empty cartridge-case and to throw it out of the breech in an oblique forward direction. If the breech-block 7 is adapted to turn on its lower front edge 9, Fig. 1, the turning motion of the extractor-hook 36 during the unlocking of the bolt for lifting the empty cartridge-case from the seat is exceedingly short and sometimes insufficient. To avoid this defect, the breech-block shown in Figs. 29 to 34 is provided with a lateral projection 121, extending downward beyond the base of the block 7, so as to form a tooth or edge 122, adapted to serve as a fulcrum for the breech-block. The frame 1 has near its front end a corresponding projection 124, Fig. 29, adapted to serve as an abutment for the arm 121 and extending backward at the lower end to form a support 123 for the fulcrum 122. The guide-pin 10 is situated between the vertical plane passing through the extractor-hook in a direction parallel with the axis of the gun-barrel and the vertical plane passing through the fulcrum 122 in a direction parallel with the said axis. Consequently the pressure on the guide-pin 10 will not tend to turn the breech-block on its longitudinal axis, Fig. 33.

As indicated by Fig. 33, the ejection of the empty cartridge-case is effected by the two-armed lever 41 42, against which the rim of the case impinges during the retractive motion of the breech-lock, causing the said case to turn on the extractor-hook and to be thrown out of the breech in an oblique rearward direction. Consequently there is some danger that the empty cartridge may hit one of the soldiers in the firing-line unless means are provided to change the direction of the empty case. For this purpose the upper part 125 of the lateral projection 121 is extended forward, so that the empty cartridge-case will strike against its side at a point adapted to deflect it in an oblique forward direction, as indicated by the arrow in Fig. 33, where the cartridge-case 126 is shown at the moment of meeting the ejector-arm 41, while the dotted lines indicate the position of the cartridge-case when it strikes against the arm 125.

As shown by Fig. 33, the rear arm 42 of the ejector is provided with a short helical spring, which tends to keep the tooth 44 clear of the open breech, so that the latter can be filled with cartridges without meeting any obstruction. The pair of guide-ledges 46, extending from the side of the breech-bolt right and left of the ejector-arm 41, have curved faces adapted to come into contact with the back of the rear arm 42 and to press the same against the spring during the retractive motion of the bolt, thereby causing the arm 41 to enter the groove 45 when required for the ejection of the empty case.

The modification of the bolt-head shown by Figs. 35 to 37 has for its object to avoid the danger of breaking the extractor-hook during the extraction of the empty cartridge-case. When the breech-bolt 7 is turned downward from the locking position (shown in Fig. 35) the lower front edge 9, Fig. 1, or the point 122, Fig. 29, acts as a fulcrum, and as the extractor-hook is situated at a much greater distance from the fulcrum than the lowest part of the rim of the cartridge-case the latter may not be able to follow the motion of the hook, in consequence of which the hook may break. To avoid this defect, I make the front part of the bolt movable, so that it can yield and adjust itself within certain limits to the position of the cartridge-case while the bolt turns downward.

As shown by Figs. 36 and 37, the cartridge-rim abuts against the flat face of a hemispherical head or plate 128, which fits into a hemispherical socket of the bolt 7 and is capable of turning therein within narrow limits determined by a slot 129 of the piece 128 and a pin 130 passing through the said slot and the bolt 7 at right angles to the latter. The circumference of the plate 128 has a tooth 131 guided in a perforation 132 of the bolt, and the center of the head 128 has a perforation 133 for the firing-needle 30. The face-plate 128 will therefore remain parallel with the base of the cartridge-case during the locking and unlocking of the bolt. Fig. 36 shows the breech-bolt 7 in its elevated or locking position, as in Fig. 35. Fig. 37 shows the position of the parts after the bolt 7 has been turned down.

The improvement in the hammer or trigger mechanism shown by Figs. 35, 38, and 39 has for its object to keep the hammer 134 out of contact with the firing-pin and breech-bolt after it has struck the pin with the tooth 136. For this purpose I use instead of the hammer-spring 85 (shown in Fig. 1) a spring 138, which has a bifurcated head 139 and a notch 140 in each branch, and I provide the hammer with a pair of side studs 137, adapted to press on the head 139. If the hammer is in the cocked position, Fig. 38, the spring 138 exercises a strong upward pressure on the studs 137. If the trigger is now pulled, and thereby the hammer released from the sear, it will turn on its fulcrum 135, and the tooth 136 will strike the firing-pin, after which the hammer will rebound for a short distance, and owing to the continued upward pressure of the spring 138 the studs 137 will enter the notches 140, as indicated by Fig. 35, and will then be maintained in that position by the pressure of the spring. The hammer remains, therefore, at a point intermediate between the firing position and the cocked position. The object of the tooth 136 on the hammer and of the heel-piece or rearward projection of the bolt is to prevent the hammer from striking the firing-pin in case the trigger is pulled and the hammer caused to strike before the bolt has reached its locking and firing position.

Figs. 40, 41, and 42 show a device for rapidly coupling the straight-pull slide with the piston-rod or for uncoupling these parts and also a modification of the ferrule or bearing-sleeve 116. (Shown in Fig. 26.) The front end 18 of the straight-pull slide has an eye for the reception of a coupling-pin 17, and the head 15 of the piston-rod 16 is bifurcated and perforated to fit on the extremity of the straight-pull slide. The pin 17 has a branch 143 parallel with 17, but longer and at a distance apart sufficient to clear the extremity of the straight-pull slide. The branch 143 passes through a hole drilled into the head 15 and has at its free end a push-button 144, by means of which the pin 17 may be pushed out of the straight-pull slide into the position indicated in Fig. 41 by dotted lines, which allows the parts 18 and 15 to be separated. The flat middle portion connecting the branch 17 with the branch 143 is normally sunk in a longitudinal slot of the head 15. A helical spring 145, coiled round the branch 143 between the button 144 and the head 15, is guided in a socket 146 of the latter, which spring tends to keep the pin 17 in the coupling position and restores the same automatically after the pressure on the button 144 has ceased. The ferrule or bearing-sleeve 141 (shown in Figs. 40 and 42) differs from the ferrule 116, Fig. 26, by the shape of the handle 142, which is bent back at a right angle against the circumference of the casing 114.

What I claim is—

1. In a small-arm having a sliding breech-bolt with transverse-locking action, the combination of a breech-block adapted to slide toward the gun-barrel in an approximately longitudinal direction and then to turn upward on a horizontal axis passing through the lower front end of the bolt, with a breech-frame adapted to receive and guide the breech-bolt, the roof of the said breech-frame forming near the middle of its length a cylindrically-curved recoil abutment and the rear end of the bolt having a cylindrically-curved face adapted to fit the said recoil abutment when the bolt is in the locking position, the breech-frame having on one side a longitudinal opening allowing to operate the bolt from the side of the frame, the tubular rear part of the frame serving to guide the breech-block, on the one hand, and the roof of the front part situated in front of the recoil-abutment on the other hand, being inclined to the axis of the gun-barrel in opposite directions, substantially as described.

2. In a small-arm having a sliding breech-bolt capable of transverse-locking motion on a cylindrically-curved recoil-abutment, whose axis of curvature is at the lower front edge of the bolt, the combination of the gun-barrel with a breech-frame having a tubular rear half adapted to receive the bolt and to guide the sliding motion toward the gun-barrel, while the front half forms a recess allowing the bolt to turn on its lower front edge and a recoil-abutment for the cylindrically-curved abutment-face of the bolt, a straight-pull slide guided by the breech-frame in a line parallel with the tubular rear half of the same, and means for acting from the straight-pull slide on the bolt, so as to produce the sliding and locking motion of the same, the tubular rear part of the frame serving to guide the breech-block, on the one hand, and the roof of the front part situated in front of the recoil-abutment on the other hand, being inclined to the axis of the gun-barrel in opposite directions, substantially as described.

3. In a magazine small-arm with sliding breech-bolt, the combination of a breech-frame having a longitudinal opening open at the rear end for receiving and guiding the bolt, with an abutment-plate mounted near the rear end of the breech-frame so as to extend into the said longitudinal opening and to be movable at right angles to the same, and a spring fixed to the breech-frame so as to support the abutment-plate in its normal position, the said abutment-plate carrying an easily accessible thumb-piece adapted to displace the abutment-plate against the pressure of the spring, so as to leave the longitudinal opening free for the removal of the breech-bolt, substantially as described.

4. The combination of a breech-frame open at the rear end for the reception of a sliding breech-bolt, with an abutment-plate mounted in a transverse bottom slot near the rear end of the frame, so as to normally extend into the interior of the frame and limit the retractive motion of the bolt, a spring fixed to the frame so as to support the abutment-plate in the normal position, and a thumb-piece guided parallel with the abutment-plate by a transverse slot in the side of the breech-frame and connected with the abutment-plate at its base, substantially as described.

5. The combination of a breech-frame having a tubular rear half and an upwardly-extending front half forming with the rear half an obtuse angle and a recoil-abutment, a sliding breech-bolt having a guide-stud extending from the side of the bolt, a straight-pull slide guided by the breech-frame in a line parallel with its rear half, the rear half of the breech-frame having a longitudinal side opening adapted to receive the guide-stud of the bolt and the straight-pull slide having a curved guide-slot adapted to receive and guide the extremity of the guide-stud, thereby imparting to the bolt a pivotal motion on its lower front edge, when the latter occupies its extreme forward position, substantially as described.

6. In magazine small-arms having a breech-bolt with longitudinal sliding and transverse-locking motion produced by a straight-pull slide, the combination of the breech-bolt having a guide-stud extending from the side of the bolt, with a breech-frame having a tubular rear half adapted to receive and guide the bolt and a longitudinal side opening adapted to receive the guide-stud of the bolt, a straight-pull slide guided along the rear half of the breech-frame and provided with a curved guide-slot adapted to receive the extremity of the said guide-stud, and a shutter mounted in the breech-frame and adapted to be operated by the straight-pull slide, so as to close the said side opening during the forward motion of the slide and to open it during the rearward motion of the same, substantially as described.

7. In magazine small-arms having a breech-bolt with longitudinal-sliding and transverse-locking motion produced by a straight-pull slide, the combination of the breech-bolt having a guide-stud extending from the side of the bolt, with a breech-frame having a tubular rear half adapted to receive and guide the bolt and a longitudinal side opening adapted to receive the guide-stud of the bolt and below the same a longitudinal slot adapted to receive a vertically-movable shutter, a straight-pull slide guided along the rear half of the breech-frame and provided with a curved guide-slot adapted to receive and guide the extremity of the said guide-stud, and a sliding shutter pivoted to the breech-frame so as to be movable in a vertical plane across the longitudinal side opening of the breech-frame, the straight-pull slide being adapted to operate the sliding shutter, so as to close the side opening during the forward motion of the straight-pull slide and to open it by descending into the longitudinal slot of the breech-frame during the forward motion of the straight-pull slide, substantially as described.

8. In magazine small-arms having a breech-bolt with longitudinal sliding and transverse-locking motion produced by a straight-pull slide, the combination of the breech-bolt having a guide-stud extending from the side of the bolt, with a breech-frame having a tubular rear half adapted to receive and guide the bolt and a longitudinal side opening adapted to receive the guide-stud of the bolt and below the same a longitudinal slot adapted to receive a vertically-movable shutter, a straight-pull slide guided along the rear half of the breech-frame and provided with a curved guide-slot adapted to receive and guide the extremity of the said guide-stud and a curved guide-face adapted to guide the sliding shutter, and a sliding shutter pivoted on a horizontal axis near the front end of the frame, so as to be movable across the side opening of the breech-frame, the said sliding shutter having a projection resting on the said guide-face of the straight-pull slide, so as to lift the shutter during the forward motion of the straight-pull slide and allow it to drop during the subsequent return motion, substantially as described.

9. In small-arms having a breech-bolt with longitudinal-sliding and transverse-locking motion, and a tubular breech-frame open at the rear end and having a longitudinal side opening, a rear dust-guard consisting of a metal plate fitting on the rear end of the breech-frame and secured thereto by spring action, the said plate having a lateral tongue extending at right angles from the same and adapted to close the rear extremity of the longitudinal side opening of the breech-frame, substantially as described.

10. In small-arms having a breech-bolt with longitudinal-sliding motion and a transverse-locking motion produced by pivoting in a vertical plane after the bolt has completed the forward stroke, a breech-bolt having in its front end an approximately hemispherical socket, a hemispherical face-plate fitting into the said socket so that its face is approximately flush with the front edge of the bolt, and a pivotal device securing the face-plate to the bolt, but allowing it to turn between limits necessary to keep the face-plate parallel with the base of the cartridge-case during the locking and unlocking motion of the bolt, the said face-plate being perforated in the center for the passage of the firing-pin, substantially as described.

11. In rifles with sliding breech-bolt and transverse-locking motion, the combination of a breech-bolt having at its front end a side lug extending downward below the front edge of the breech-bolt and a cartridge-extractor adapted to hold the rim of the cartridge, with a breech-frame adapted to receive the breech-bolt and having at its front end a supporting-face arranged on one side so as to support the extremity of the downward arm of the breech-bolt and to serve as a fulcrum for the transverse locking and unlocking motion of the breech-bolt, substantially as described.

12. In rifles with sliding breech-bolt and transverse-locking motion, the combination of a breech-bolt having at its front end a side lug adapted to serve as a pivotal bearing for the cartridge-extractor and a casing for the extractor-spring, and having an arm extending downward below the front edge of the breech-bolt, a cartridge-extractor pivoted in the said side lug and adapted to hold the rim of the cartridge, and a helical spring inclosed in the said side lug and adapted to press on the extractor so as to hold the said rim, and a breech-frame adapted to receive the breech-bolt and having at its front end a supporting-face adapted to support the extremity of the downward arm of the breech-bolt and to serve as a fulcrum for the transverse locking and unlocking motion of the breech-bolt, substantially as described.

13. In rifles with sliding breech-bolt, a device for the ejection of the empty cartridge-case held by the extractor, consisting of a two-armed ejecting-lever mounted in a slot of the breech-frame so that its fulcrum is at right angles to the sliding motion of the breech-bolt, a recess and a pair of guide-ledges formed on the side of the breech-bolt near the front end of the same, and an ejector-spring situated in the said slot of the breech-frame and tending to keep the front arm of the ejector out of the recess of the breech-bolt, the said guide-ledges having a curved face adapted to come in contact with the rear arm of the ejector and to turn the same while compressing the spring, so that the front end of the ejector enters the said recess of the breech-bolt and forms an abutment for the rim of the empty cartridge-case during the retractive motion of the bolt, in consequence of which the cartridge-case is thrown out of the breech, substantially as described.

14. In a rifle with sliding breech-bolt, the combination of a cartridge-extractor and an ejector, with a device for deflecting the empty cartridge-case while being thrown out of the breech, consisting of a deflecting-arm extending from the front end of the breech-bolt in a forward and outward direction, so that the side of the cartridge-case will touch the same at a point adapted to deflect the cartridge-case in an oblique forward direction, substantially as described.

15. In a magazine small-arm having a gas-piston and cylinder adapted to operate the loading mechanism automatically by the pressure of a portion of the powder-gases and a helical spring the combination of a gun-barrel having at its rear end a side arm adapted to hold the open rear end of the gas-cylinder and to serve as a continuation of the same, with a gas-cylinder fixed to the said arm parallel to the gun-barrel, a piston-rod extending through the rear end of the gas-cylinder and through the side arm, a helical spring coiled round the piston-rod and inclosed in the gas-cylinder behind the piston, and a detachable ferrule mounted on the piston-rod, so as to extend into the side arm of the barrel and to serve as an abutment for the helical spring, the said ferrule having at its outer end a handle and at its inner end a pair of radial projections, and the side arm having in its rear end a pair of short grooves adapted to receive the said projections and opening into a cavity allowing the ferrule to turn in the same, substantially as described.

16. In a self-loading magazine-rifle having a straight-pull bolt-operating slide provided with a handle, and a gas-piston coupled together with the straight-pull slide, a detachable coupling between the straight-pull slide and the piston-rod, comprising a coupling-pin passing through the piston-rod head and the straight-pull slide at right angles to the piston-rod, a spring adapted to hold the pin in the coupling position, and a button adapted to release the pin from one of the coupling members by overcoming the pressure of the spring, substantially as described.

17. In a self-loading magazine-rifle having a straight-pull bolt-operating slide provided with a handle and a gas-piston coupled together with the straight-pull slide by a coupling-pin, the combination of the straight-pull slide having an eye for a coupling-pin, with a piston-rod head having an eye for the coupling-pin and a perforation parallel to the coupling-pin at a distance sufficient to clear the outline of the straight-pull slide, a coupling-pin having two parallel arms, the short arm fitting into the said eyes, and the long arm passing through the said perforation and carrying a push-button, and a spring coiled round the long arm between the piston-rod head and the push-button, the whole being adapted to operate substantially as described.

18. In small-arms having a longitudinally-sliding breech-bolt with transverse-locking action produced by turning upward on its lower front edge into the firing position, and a breech-frame having in its upper part a recoil abutment for the abutment-face at the rear end of the bolt, the combination of a breech-bolt having below the said abutment-face a rearward projection and a firing-pin passing through the said projection, with a hammer pivoted underneath the breech-frame and having at its upper front edge a forwardly-projecting tooth adapted to strike the head of the firing-pin, when the bolt is in the firing position, substantially as described.

19. In a magazine-firearm with self-loading breech-bolt a striking and trigger mechanism comprising a hammer, a sear and sear-spring adapted to lock in the cocked position, a trigger mounted at a suitable distance behind the sear, a connecting-rod pivoted to the trigger between its fulcrum and the lock-plate, the front end of the connecting-rod being situated below the sear and provided with a tooth adapted to engage the sear, a spring tending to press the rear end of the connecting-rod downward against an inclined face of the lock-plate, and a hammer-spring tending to throw the hammer upward into the firing position, the whole being adapted to operate substantially as described.

20. In a trigger mechanism adapted to act from the trigger on the sear by means of a connecting-rod pivoted to the trigger above the lock-plate and in an approximately horizontal position, the front end of the connecting-rod having a tooth adapted to drop out of contact with the sear and thereby to release the latter, the combination of the lock-plate and connecting-rod with a locking-slide guided in the lock-plate and adapted to hold the connecting-rod out of engagement with the sear, the said locking-slide extending through the lock-plate and having a button adapted to be operated by a finger, substantially as described.

In witness whereof I have signed this specification in the presence of two subscribing witnesses.

THOMAS ROBERT RANEY ASHTON.

Witnesses:
JASPER WETTER,
H. D. JAMESON.